United States Patent
Bugnet et al.

(10) Patent No.: US 6,287,446 B1
(45) Date of Patent: Sep. 11, 2001

(54) HIGH POROSITY THREE-DIMENSIONAL STRUCTURES IN CHROMIUM BASED ALLOYS

(75) Inventors: Bernard Bugnet, Le Plessis-Trevise; Denis Doniat; Robert Rouget, both of Paris, all of (FR)

(73) Assignee: S.C.P.S. Societe de Coneil et de Prospective Scientifique S.A.

( * ) Notice: Subject to any disclaimer, the term of this patent is extended or adjusted under 35 U.S.C. 154(b) by 0 days.

(21) Appl. No.: 09/333,598

(22) Filed: Jun. 15, 1999

(51) Int. Cl.[7] .................. C25D 3/04; C25D 7/00
(52) U.S. Cl. .............. 205/150; 205/283; 205/286; 428/605; 428/613
(58) Field of Search ................... 428/613, 605, 428/666, 667, 935; 502/527.24; 205/150, 156, 283, 286, 180

(56) References Cited

U.S. PATENT DOCUMENTS

| | | | |
|---|---|---|---|
| 3,161,478 | * 12/1964 | Chessin | 428/613 |
| 4,076,888 | * 2/1978 | Perugini et al. | 428/613 |
| 4,882,232 | * 11/1989 | Bugnet et al. | 428/613 |
| 5,098,544 | * 3/1992 | Brannan | 205/150 |
| 5,584,983 | * 12/1996 | Pruyn | 205/150 |
| 5,830,415 | * 11/1998 | Maeda et al. | 428/613 |
| 6,051,117 | * 4/2000 | Novak et al. | 428/613 |
| 6,103,397 | * 8/2000 | Sugimoto et al. | 428/613 |

FOREIGN PATENT DOCUMENTS

| | | |
|---|---|---|
| 2 258 466 A | 8/1975 | (FR) . |
| 603762 A | 6/1948 | (GB) . |
| 2 006 271 A | 5/1979 | (GB) . |
| 55-99341 | * 7/1980 | (JP) . |
| 6-236829 | * 8/1994 | (JP) . |
| 11-16707 | * 1/1999 | (JP) . |

OTHER PUBLICATIONS

Chemical Abstracts, vol. 109, No. 26, Dec. 26, 1988; Columbus, Ohio, US; abstract No. 239204, Baumgartner, Charles E.: "Passivation of porous nickel plaque against corrosion in nickel dinitrate solutions" XP002079081 *agrege* & J. Electromchem. Soc. (1988), 135(10), 2541–2 Coden: Jesoan; ISSN: 0013–4651 (No Month).

Patent Abstract of Japan, vol. 097, No. 001, Jan. 31, 1997 & JP 08 225866 A (Sumitomo Electrick Ind Ltd), Sep. 3, 1996 *abrege*.

* cited by examiner

Primary Examiner—John J. Zimmerman
(74) Attorney, Agent, or Firm—Henderson & Sturm LLP

(57) ABSTRACT

The invention relates to metallic products and a process for producing these which allows, despite the complexity of their structure, for them to be produced in refractory alloys based on chromium. The chromium is deposited by electrolysis, this being carried out by means of a bath with high throwing power. The formation of the alloy with layers of other metallic constituents is obtained by thermal diffusion. The provision of aluminum is controlled in the form of particles by immersing, by spraying or "painting." The structures according to the invention are particularly intended to be used as catalyst supports or filtering agents.

10 Claims, No Drawings

HIGH POROSITY THREE-DIMENSIONAL STRUCTURES IN CHROMIUM BASED ALLOYS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to the field of catalyst supports and that of filtering agents.

More particularly it relates to the use of metallic structures of high porosity produced in refractory alloys for uses in catalysts and in filtration.

2. Description of the Prior Art

The widespread use of nickel (Ni) sponges as supports and collectors for positive electrodes of metallic nickel-cadmium and nickel hydride alkaline batteries is known. These products have reticular cellular structures with total or very widely open porosity.

The nickel sponges constitute one of the families of "three-dimensional" metallic structures (or "3D") with high porosity, which also include felt type products (interlocking of nonwoven fibres), as well as woven types. The latter are most often constituted by two woven surfaces connected by coupling, by threads which are approximately transverse to the surfaces.

The "3D" metallic structures are most often produced according to a process which respects the sequence of the following operating stages: conductive activation of a base substrate of organic material; metallization by electrolysis; burning off the organic materials (original substrate and optionally the conductive activation products); deoxidation and annealing of the metallic structure obtained.

The use of these structures for applications such as filtration or catalysts often proves to be particularly useful due to their high porosity and levels of loss of potential which can be chosen as a function of requirements.

One of the limitations to these applications relates to particular thermal or chemical constraints which can be encountered, and which means that structures produced in nickel can oxidize or corrode, in an oxidizing environment, at high temperature.

In order to overcome these drawbacks and to obtain satisfactory results, it is necessary to resort to so-called refractory alloys, one of the components of which is chromium (Cr).

The production processes for "3D" metallic structures, as has been mentioned, generally require a galvanic deposition stage which makes the production of complex alloys difficult.

To respond in part to this problem, various routes have been proposed, applied to the family of sponges:

the production of sponges of alloys, by particle sintering, case hardening of chromium, on the nickel sponges.

The first technique is delicate to implement and is difficult to exploit industrially due to constraints related to handling the powders and the difficulty in sintering particles of refractory alloys.

The second technique requires commercially available supports (nickel sponges) and a known technique (case hardening). Thus, DUNLOP patents mention the production of a nickel-chromium alloy sponge (Ni—Cr) based on this principle.

The case hardening of chromium (chromizing) is traditionally applied to items with a simple shape, of small to medium size. When it is implemented with supports with very complex shapes, such as metallic sponges, several difficulties are apparent:

the case hardening composition, constituted by chromium powder and a gel, must penetrate uniformly inside the porous structure. The operation is difficult to carry out in a homogeneous manner with sponges with an average pore size (between 45 and 80 PPI), impossible with structures which have a very fine pore size (sponges between 80 and 100 PPI), are highly tortuous (felts), or thick and dense (woven);

at the end of the treatment cycle, the case hardening composition must be eliminated; the chromium grains have a tendency to agglomerate, and mechanical operations are then necessary to rid the sponges of the case hardening composition.

Moreover, the penetration of the chromium thus deposited within the nickel layer is superficial, as a result of the production principle. The alloys formed by diffusion of the components provided in the forms indicated is therefore heterogeneous and this limits the thermal resistance of the structure due to the risk of oxidation of the sub-layer of metal which is an alloy with a low chromium content.

The authors of the present invention have shown that in order to overcome these various problems, it is appropriate to implement specific electrolytic deposition techniques, to deposit the chromium within the porous structure, over the totality of its developed surface, and to produce the alloy by thermal diffusion between the layers created with its various constituents.

In order, in particular, to produce refractory alloys, capable of resisting high temperatures, it is necessary to form ternary alloys such as Ni—Cr—Al, Fe—Cr—Al, or quaternary alloys, Ni—Fe—Cr—Al.

These alloys could only be produced with difficulty by codepositions. It is therefore necessary to resort to successive provisions of each of the constituents of the intended alloys.

It is known that the deposition of nickel is carried out by electrolytic route, on structures of sponge type or of felt type which have been rendered conductive (activated).

Furthermore, an activation technique for porous polymeric supports (sponges, felts or woven items) has been developed and patented which allows, under excellent conditions, for a good level of conductivity to be conferred and for various metals such as nickel, iron, copper or binary or ternary alloys of these metals to be applied by electrolytic deposition.

This technique is the activation of polymer conductors by chemical deposition (French Patent No. 95 09547, publication No. 2 737 507).

The provision of chromium can also be carried out industrially by electrolytic deposition. However, this operation is usually carried out on metal items with a relatively simple shape and with smooth surfaces. In fact, a person skilled in the art knows that chromium baths used for hard chromium plating or for decorative chromium plating have a reduced throwing power, which leads to the lack of chromium deposit or a poor quality deposit in certain areas of the item to be treated, as a function of the characteristics of the lines of electric flux.

The artifices which consist, for example, of using anodes with a special shape which will concentrate the lines of electric flux in the areas where they are little present, cannot be considered for structures with such complex shapes as "3D" products (sponges, felts or woven items).

As well as the low throwing power, which leads to a lack of chromium deposit in the areas masked vis-à-vis the anode or at the core of the porous structure, the electrolysis operating conditions lead to deposition characteristics which are not satisfactory: growths on the edges or streaks on the surface of the "3D", burnt and friable deposits, etc.

DETAILED DESCRIPTION OF THE INVENTION

The authors of the invention which is the subject of the present description have therefore developed chromium baths which allow all of these defects to be suppressed and allow chromium deposits to be obtained which are thick and uniform on complex surfaces, such as "3D" sponges, felts or woven items, i.e. through all the thickness of these structures, over the totality of their developed surface (by a complete covering of meshes of sponges, threads or fibres of felts and woven items), without closing their porosity.

The most commonly used baths in industry are based on chromic acid and sulphuric acid. In order to increase the covering power of the bath, which requires the reduction of the current density at which the deposit starts to form, it is recommended by persons skilled in the art to respect a given ratio between the bath concentration of chromic acid and that of sulphuric acid. Therefore, for a chromic acid concentration of 300 g/l, the chromic acid/sulphuric acid ratio will have to be 140.

For the treatment of sponge type structures, this precaution remains insufficient if the intention is to produce a homogeneous chromium deposit, covering each strand.

It is also recommended to use baths containing fluorinated acids, such as fluosilicic acid, hydrofluoric acid, fluoboric acid. Therefore, in order to increase the covering power, baths are produced the composition of which is of the following type:

| | |
|---|---|
| chromic acid: | 250 g/l |
| sulphuric acid: | 0.6 g/l |
| fluosilicic acid $H_2SF_6$: | 1% |

However, and in particular with a sponge called "45 PPI" (measurement of approximately 45 pores per linear inch of the surface), thickness 5 mm, such a composition principle does not allow the deposition of chromium at the core of the "3D" structure.

On the other hand the authors have shown that the use of potassium and/or sodium dichromate allows the throwing power and covering power to be sufficiently improved so that chromium is deposited at the core of thick sponges or felts, in particular with dichromate/chromic acid ratios comprised between 0.25 and 1.50 by weight, and in particular between 0.80 and 1.20.

This development in chromium plating baths therefore makes the metallization of "3D" structures possible under the sought conditions, either through the full thickness of these structures or over the totality of their developed surface (by the complete covering of meshes of sponges, threads or fibres of felts or woven items), without closing their porosity.

Another of the essential components of refractory alloys is aluminum. At high temperature, aluminum in fact forms a protective oxide layer of the alloy.

The aluminum can be introduced, during the operating process, in different ways:

by immersing in a slip containing aluminum particles in suspension, by spraying a suspension of aluminum particles, by "painting" using a lacquer or paint containing aluminum particles.

A thermal diffusion of the constituents of the intended alloys can be carried out, in one go after setting up the totality of the constituents, or in several sequences, including the possibility of carrying it out after each provision of a layer of constituent It is possible to use very fine particles of aluminum (<10 microns). The diffusion of the aluminum through the metallic layers therefore occurs easily.

The operating process for the preparation of a sponge of Ni—Cr—Al alloy is given hereafter as an illustrative but non limitative example of the present invention.

EXAMPLE

A "45 PPI" sponge, the average pore diameter of which is 0.3 mm, is cut into 5 mm thick sheets. Activation is carried out on a 1 $dm^2$ sheet according to the technique described in the French Patent No. 95 09547 in order to render the sponge electrically conductive. A first deposit of nickel is produced using a nickel sulphonate bath at the rate of 800 $g/m^2$ of the apparent surface of the sponge.

Then a chromium deposit is carried out using a bath, the composition of which is as follows:

| | |
|---|---|
| chromic acid: | 300 g/l |
| sodium dichromate: | 80 g/l |
| sodium sulphate: | 3 g/l |

In this example the provision of sulphate ions is controlled by the introduction of sodium sulphate.

The operation is carried out with a current density of 40 $A/dm^2$, at temperatures comprised between approximately 15 and 25° C.

The anodes are constituted by lead with an active surface twice as great as the apparent surface of the nickel sponge.

A quantity of chromium is deposited corresponding to 200 $g/m^2$, i.e. a thickness of approximately 2.5 microns.

The sponge obtained is then painted by spraying using a suspension of aluminum particles.

The whole is finally treated in an oven with an inert atmosphere for 4 hours. In the first instance the operation is carried out with a stage at a temperature of approximately 500° C., which is lower than the melting point of aluminum, in order to allow the diffusion of the aluminum into the metallic layers, then the temperature is raised to approximately 1000° C. in order to realise the diffusion of all the other constituents of the alloy.

X-ray microanalysis, performed on sections of the metallic covering thus forming the constitutive strands of the structure, shows that from the core to the surface of this, the development of the alloy composition is as follows:

| | |
|---|---|
| nickel: | 80 to 75% |
| chromium: | 14 to 17% |
| aluminium: | 6 to 9% |

It should be noted that the technique for chromium deposition used and the addition of aluminum produce coverings which can be referred to as homogeneous and which answer the problem posed in a satisfactory manner.

If the operation is carried out according to the operating method of the example indicated above with a 90 PPI sponge, the observed distribution of the components of the alloy is identical.

Naturally, and moreover as results largely from what precedes, the invention is not limited to the particular embodiments described as examples. The invention is not limited to the examples provided, but can encompass all variants.

What is claimed is:

1. Process for the production of three-dimensional metallic reticular structures with high porosity in refractory alloys containing chromium, wherein a step of electrically depositing chromium is carried out in a bath containing chromic acid and at least one of potassium dichromate and sodium dichromate, the dichromate/chromic acid ratios being comprised between about 25% and about 150% by weight, the three-dimensional structure being one of a non-sintered sponge, a felt and a woven item.

2. Process for the production of metallic structures according to claim 1, wherein said refractory alloys are one of ternary and quaternary, selected from the group consisting of nickel-chromium-aluminum, iron-chromium-aluminum, nickel-iron-chromium, and nickel-iron-chromium-aluminum.

3. Process for the production of metallic structures according to claim 1, wherein addition of aluminum is carried out by immersing a slip containing aluminum particles in suspension.

4. Process for the production of metallic structures according to claim 1, wherein addition of aluminiunm is carried out by spraying a suspension of aluminum particles.

5. Process for the production of metallic structures according to claim 1, wherein addition of aluminum is carried out by painting the structure uslng one of a lacquer and paint containing aluminum particles.

6. Process for the production of metallic structures according to claim 2, wherein iron and/or nickel is provided by electrolytic deposition.

7. Process for the production of metallic structures according to claim 1, wherein the alloy is produced by thermal diffusion treatment of its various constituents.

8. Process for the production of metallic structures according to claim 2, wherein addition of aluminum is carried out by immersing in a slip containing aluminum particles in suspension.

9. Process for the production of metallic structures according to claim 2, wherein addition of aluminum is carried out by spraying a suspension of aluminum particles.

10. Process for the production of metallic structures according to claim 2, wherein addition of aluminum is carried out by painting the structure using one of a lacquer and paint containing aluminum particles.

* * * * *